Feb. 4, 1936.  J. G. McNALLY  2,029,931
LAMINATED GLASS AND METHOD OF MAKING THE SAME
Filed July 29, 1932
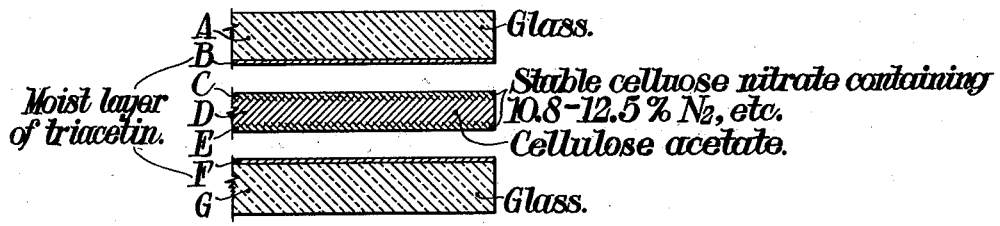
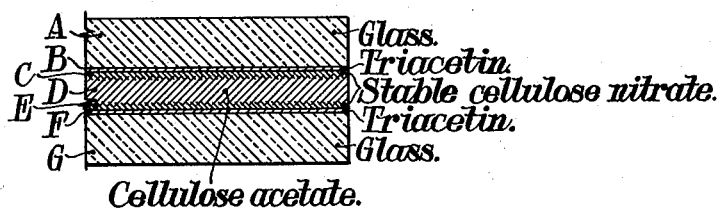
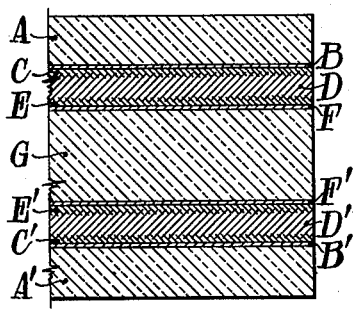
James G. McNally,
Inventor:
By Daniel J. Mayne
Attorneys Patented Feb. 4, 1936

2,029,931

UNITED STATES PATENT OFFICE 2,029,931

LAMINATED GLASS AND METHOD OF MAKING THE SAME

James G. McNally, Rochester, N. Y., assignor to Eastman Kodak Company, Rochester, N. Y., a corporation of New York Application July 29, 1932, Serial No. 625,709

4 Claims. (Cl. 49—81)

This invention relates to the production of laminated glass and more particularly to a method of making such a product by cementing a sheet of tough, stable, thermoplastic cellulose organic derivative material to sheets of glass by means of a special type of adhesive layer and a special adhesion inducing agent.

Many types of laminated glass are known. In practically all of these products a sheet of transparent thermoplastic material is interposed between two or more sheets of glass and adhesively secured thereto by means of special cements. The principal problems encountered in the production of this so-called safety glass have centered around the selection of the proper adhesives. It has been proposed to unite a sheet of either cellulose acetate or cellulose nitrate to glass by treating it with various plasticizing substances, interposing the treated sheets between sheets of glass and applying heat and pressure, but notwithstanding the claims made for these methods, they have never proved to be satisfactory in many respects and it is well recognized among glass manufacturers that a satisfactory product cannot be manufactured in this manner.

When using cellulose nitrate as the principal plastic layer, it is found that the glass, even after relatively short periods of exposure, turns yellow or even brown, due to the photo-chemical decomposition of the cellulose nitrate. It is, therefore, desirable to use a type of material which will withstand the action of sunlight and is substantially unaffected by photochemical action. Cellulose acetate fully meets these requirements, but as above indicated, the problem has been so to secure the cellulose acetate sheet to the glass that it will not separate or chip off when injured by a sudden blow. It is of first importance in this type of glass that the adhesion will be of such a character that when the glass surface is broken, the broken particles of glass will remain firmly stuck to the interposed plastic layer or layers.

My invention has as an object to overcome the above mentioned prior art difficulties and to provide a product in which the glass is firmly and, to all intents and purposes, inseparably united to the interposed plastic material. A further object is to provide a process for producing a tough, strong, non-brittle, transparent, laminated glass which is stable with respect to sunlight and immune to photochemical discoloration. Another object is to provide a process for cementing preformed sheets of colloidized cellulose organic derivatives to glass surfaces. A specific object is to provide a new type of laminated glass in which cellulose acetate, or its equivalents, is permanently and adhesively joined to glass by means of two or more interposed adhesive layers. Other objects will hereinafter appear.

In its essential features, my invention may be said to involve the coating of a sheet of tough, stable, transparent cellulose derivative, preferably cellulose acetate, with a thin coating of a particular type of cellulose nitrate. The cellulose acetate sheet may be formed in any well known manner, such as casting from a solution of the cellulose acetate in proper solvents, the solution containing, if desired, any of the well-known cellulose acetate plasticizers, stabilizing or other agents. The special cellulose nitrate coating may be applied to the sheet thus formed in any desired manner, preferably by spraying a solution of this nitrate thereon. It should be noted here that in selecting the plasticizers for the solution from which the original sheet of cellulose acetate is coated, they should be selected on the basis of their compatibility with cellulose nitrate as otherwise the cellulose nitrate lacquer may blush or turn white when the plastic sheet is pressed between glass plates as hereinafter described. After drying, the sheet of plastic material will consist of a sheet of cellulose acetate having both surfaces coated with a thin layer of a special type of cellulose nitrate to be hereinafter more particularly described. Two sheets of glass are then moistened with a thin layer of a high-boiling plasticizer, such as triacetin, benzyl alcohol, or salicylaldehyde, and the moistened glass surfaces then applied to the cellulose acetate sheet prepared as just described. Similarly the nitrate may be moistened and the glass pressed against it. After applying a heavy pressure at a temperature substantially below the boiling point of the plasticizer for a short period of time, the laminated sheet is completely formed.

The special type of stable cellulose nitrate which I have found suitable for producing my improved product is a stable compound conforming to certain definite specifications. It must, for example, have a nitrogen content of approximately 10.8–12.5%, a viscosity of not more than 50 seconds, and preferably about 2–1 seconds, as determined by the dropping ball method and an ash of not more than .4%. Such a nitrate may be prepared by usual known technique of preparing cellulose nitrate, so long as the conditions of its preparation are so controlled as to result in a product conforming to the above specifications. A convenient method of preparation is carried out substantially as follows:

Pure cotton linters having a standard cuprammonium viscosity of about 20 seconds as determined, for example, by the method described in the Journal of Industrial and Engineering Chemistry for January 15, 1929, at page 49, are immersed for a period of 45 minutes in a nitration bath consisting of a mixture of sulfuric and nitric acid having a total acidity of 80.14%, maintained at a temperature of 110° F. The ratio of sulfuric to nitric acid is maintained at approximately 3:1 and the ratio of the weight of cotton to the weight of acid is maintained at approximately 1:52. After nitration is completed, the product is stabilized by washing with 12–30 changes of boiling distilled water, each change representing 12 parts by weight of water to 1 part of nitrocellulose. After appropriate drying, the product is found to be very stable and have a nitrogen content of 11.01%, a viscosity of 5 seconds, and an ash of .1%.

The nitrogen content, viscosity and ash content of a cellulose nitrate prepared as described in the previous paragraph may each vary widely and still meet the requirements of the present invention, provided they do not exceed the values indicated. It may be said in general that the lower the nitrogen, viscosity, and ash, the better will be the results obtained in the process herein described.

As indicated above, the viscosity of the cellulose nitrate is measured by the dropping ball method, the procedure for which is substantially as follows:

10 grams of dry nitrocellulose is dissolved in 10 cc. of a mixture comprising 50% by volume of methyl alcohol and 50% by volume of acetone at 25° C. The viscosity is measured by the time in seconds which it takes for a steel ball having a diameter of ⅛ of an inch and weighing .1320–.1340 grams to fall 15 cm. through the nitrocellulose solution at 25° C. in a tube having a diameter of 1.7 plus or minus −.05 cm.

It should be noted that the cellulose nitrate employed in the manufacture of laminated glass according to the present invention should be stable in order to preclude the possibility of discoloration due to photochemical decomposition. Cellulose nitrate is considered stable according to my invention when it will not turn blue litmus pink in less than 25 minutes, produces substantially no brown fumes, and does not explode in less than four hours when subjected to the well-known German heat test carried out at a constant temperature of 135° C.

My invention is particularly distinguished by the fact that I have perfected a technique whereby cellulose acetate and its equivalents may be adhesively secured to glass my means of high-boiling plasticizers. As I have indicated, extensive experimental work has proved it is impossible, for example, to satisfactorily cement a cellulose acetate sheet to a sheet of glass merely by treating the cellulose acetate with a high-boiling plasticizer assembling the sheets and then applying pressure. I have found that adhesion may be accomplished if the cellulose acetate is coated on both sides with a thin layer of cellulose nitrate of the type described above and thereafter pressing the glass surfaces, previously moistened with the high-boiling plasticizer, against the cellulose nitrate-coated cellulose acetate.

One important point in coating the cellulose acetate plastic with cellulose nitrate should be emphasized and that is the desirability of using in the nitrocellulose solution a cellulose nitrate solvent, or mixture of solvents, which has a swelling action on the cellulose acetate. Although not fully understood, these agents wet the cellulose acetate and cause a certain amount of swelling action thereon so that, upon evaporation of the solvent from the coating, the cellulose nitrate has penetrated or become interspersed with this superficially swelled layer of cellulose acetate thereby forming a strong, tenacious bond between the two layers. The cellulose nitrate layer may accordingly be said to be bonded or welded to the cellulose acetate by a joint or bond having substantially the strength of an autogenous bond. It will thus be seen that the sequence of operations is of considerable importance in producing a satisfactory type of laminated glass. In other words, it is first necessary to prepare the proper thermoplastic sheet by coating it with a layer of cellulose nitrate and then, and not until then, applying the plasticizing material either to the cellulose nitrate layer or to the glass surface and then causing the composite plastic sheet and glass to finally adhere.

In the following example I present one of the preferred embodiments of my invention which is included merely for the purposes of illustration and not as a limitation.

A cellulose acetate plastic sheet about 0.020″ thick is made by casting from an appropriate dope or by skiving a thin sheet from a thick, preformed block of the material. Although not limited thereto, the cellulose acetate is preferably of that variety which is freely soluble in acetone and the plastic sheet preferably contains from 25–35% by weight of the cellulose acetate of a plasticizer such as diethyl phthalate which is compatible with both cellulose acetate and nitrate. This plastic sheet is coated with a solution of cellulose nitrate dissolved in a solvent which has the power of wetting and swelling the cellulose acetate without dissolving it.

A typical composition for coating the cellulose acetate sheet contains the following ingredients, expressed as parts by weight.

| | Per cent |
|---|---|
| Cellulose nitrate | 1 |
| Methyl alcohol | 49 |
| Butyl alcohol | 50 |

To this composition plasticizers or stabilizers for cellulose nitrate may be added, if desired.

This coated plastic sheet is now cemented between glass plates as follows: Two glass plates about ⅛″ in thickness are thoroughly cleaned and dried. One surface of each of the glass sheets, or of the faces of the composite cellulose derivative sheet, are moistened with a liquid high-boiling plasticizer for both the cellulose nitrate and cellulose acetate, such as triacetin, salicylaldehyde, benzyl alcohol, and the surfaces of glass are applied to the cellulose nitrate coated cellulose acetate. The laminated glass structure is then inserted in a platen press and a pressure of 100–200 lbs. per sq. in. is applied at a temperature of 100° C. The glass is then removed from the press and is completely immersed in an inert liquid in a liquid pressure autoclave and heated for 10–20 minutes at pressures ranging from 10–300 lbs. per sq. in. at a temperature of 100–200° C.

Various modifications may be made in the above process within the scope of my invention. For example, the cellulose acetate sheet may be obtained by skiving a thin slab from a block of preformed cellulose acetate of proper composition. If a skived slab is used, the application of cellulose nitrate may be accomplished by immersing the sheet in a solution of the composition indicated in the example and allowing the sheet to drain and dry after removal from the solution. The coating of the sheet may be accomplished by spraying, rather than immersing, if desired. If the cellulose acetate plastic is made as a continuous sheet by casting and drying a dope, the application with cellulose nitrate can conveniently be made by means of subbing rolls, or by either of the two previously indicated methods.

The composition of the original cellulose acetate plastic sheet may vary widely, depending upon the physical characteristics, such as transparency, toughness, flexibility, color, etc., which may be desired in the finished product. Among the plasticizers which may be successfully used in making up the cellulose acetate sheet are dimethyl phthalate, orthocresyl paratoluene sulfonate, normal butyl sulfone, butyl phthalate, triorthocresyl phosphate, diethyl phthalate, triacetin and others. Although I prefer to use the acetone soluble variety of cellulose acetate, I am not limited thereto, since I may employ the chloroform soluble variety and other cellulose acetates having a varying acetyl content. It should be noted, however, in this connection, that when using a cellulose acetate of other than the acetone-soluble variety, it will be necessary to adjust the composition of the cellulose nitrate overcoating solution to provide that the solvents employed will have the desired swelling effect upon the particular type of cellulose acetate dealt with to produce the bonding effect between the nitrate and acetate layers previously alluded to.

The composition of the cellulose nitrate overcoating solution may itself vary widely in both proportion and constituents, depending largely upon the type of material to which it is to be applied. Any suitable plasticizers, or stabilizing agents for the cellulose nitrate may be used. It is, of course, necessary to select plasticizers for this solution which are also compatible with cellulose acetate. Typical among the various stabilizing agents employed may be mentioned urea, salts of weak acids, such as lead naphthenate. Many others will suggest themselves to those skilled in the art.

Although I have described my invention with particular reference to cellulose acetate as the plastic sheet in making up laminated glass products, I do not wish to be understood as limiting my invention thereto, as it is equally applicable to the production of safety glass from various cellulose organic derivatives. Plastic sheets of the desired characteristics may be prepared, for example, from solutions in proper solvents of higher cellulose organic esters, such as cellulose propionate, butyrate, laurate, lactate, and stearate, or from solutions of the mixed esters, such as cellulose acetate propionate, acetate butyrate, and acetate nitrate. Cellulose ethers may also be employed for this purpose, typical among which are benzyl cellulose and ethyl cellulose.

I am not limited to the use of triacetin as a substance for inducing the adhesive joining of the plastic material to the glass, since I may use a wide variety of high boiling plasticizers with desirable results.

Among these may be mentioned triacetin, benzyl alcohol, benzyl acetate, diacetone alcohol, ethyl benzoate, acetophenone, salicyl aldehyde, cinnamic aldehyde, hydrocinnamic acid, hexaethylene glycol acetate, ortho-penta ethylene glycol acetate, ethoxy ethyl phthalate, or various plasticizing mixtures selected from the following in which the ingredients are expressed in parts by weight.

1. 17 parts benzyl alcohol
    3 parts triacetin
    $\frac{1}{10}$ part camphor
2. 13 parts ethoxy ethyl phthalate
    1–5 parts triphenyl phosphate
3. 1 part triphenyl phosphate
    1 part of tricresyl phosphate
    1 part of benzyl alcohol
4. 18 parts of benzyl alcohol
    2 parts of butyl alcohol
    $\frac{1}{10}$ part camphor
5. 8 parts of benzyl alcohol
    2 parts of butyl alcohol
    $\frac{5}{10}$ part camphor or triphenyl phosphate
6. 1 part triphenyl phosphate
    1 part of tricresyl phosphate
    1 part of methyl or benzyl alcohol The term high boiling plasticizers is used herein and in the claims to indicate plasticizers whose boiling points range from about 128° C. to about 325° C. and in general to indicate those plasticizing substances commonly referred to as high boilers.

Referring now to the accompanying drawing,

Fig. 1 is a fragmentary sectional view illustrating the various laminations before they are united.

Fig. 2 is a fragmentary sectional view of the finished product comprising two sheets of glass between which the plastic material is interposed.

Fig. 3 also is a fragmentary sectional view of a type of product known as "bulletproof" glass.

In Fig. 1 I have shown the plastic sheet D coated on each side with thin layers of cellulose nitrate C and E which are united to the plastic material by a bond produced by the swelling action of the cellulose nitrate solvents and the comingling of the immediately contacting portions of the cellulose acetate and the cellulose nitrate. The glass sheets A and G receive an extremely thin moist layer of the high boiling plasticizer, such as triacetin, and are then united under the influence of heat and pressure to form the product shown in Fig. 2.

It will thus be seen from Fig. 2 that the finished product may be considered to consist of seven distinct zones of material, namely, a sheet of glass A, an extremely thin layer of triacetin B, a thin layer of cellulose nitrate C, a sheet of cellulose acetate plastic D, a second thin layer of cellulose nitrate E, a second extremely thin layer of triacetin F, and, finally, the second sheet of glass G.

The product illustrated in Fig. 3 is in all respects similar to that shown in Fig. 2, except that it consists of two sheets of glass of ordinary thickness, united to a third sheet of glass of substantially greater thickness by means of the interposed plastic sheets D and D' respectively. This type of product is generally known as "bulletproof" glass and will withstand shocks of considerably greater force and intensity than the material having a less number of laminations.

It will be apparent that my invention provides a means for solving the long-standing problem of cementing a sheet of cellulose derivative plastic material directly to a glass surface and enables me to produce a highly satisfactory material for a wide variety of uses. Typical among such uses I may mention the windshields of automobiles. My new laminated glass is not only stronger and more resistant to the shattering effect of sharp blows, jars or other forces but, in addition, is practically immune to photochemical discoloration. It has been shown by extensive tests over a considerable period of time that these products are substantially unaffected by continued exposure to the brightest sunlight.

As many apparent and widely different embodiments of this invention may be made without departing from the spirit and scope thereof, it is to be understood that I do not limit myself to the specific embodiments thereof, except as defined in the appended claims.

Having now described my invention, what I claim as new and desire to be secured by Letters Patent of the United States is:

1. The method of making laminated glass which comprises placing a sheet of cellulose organic ester having on each face thereof an adherent coating of a stable cellulose nitrate having a nitrogen content of 10.8–12.5%, a viscosity of not more than 50 seconds, and an ash of not more than .4%, between sheets of glass, interposing a thin layer of triacetin between the contiguous surfaces of glass and cellulose nitrate, and uniting the sheets by heat and pressure.

2. Laminated glass comprising sheets of glass, a sheet of cellulose organic ester interposed therebetween and having on each face thereof an adherent coating of a stable cellulose nitrate having a nitrogen content of 10.8–12.5%, a viscosity of not more than 50 seconds, and an ash of not more than .4%, and a thin layer of triacetin between the contiguous surfaces of glass and cellulose nitrate.

3. Laminated glass comprising sheets of glass, a sheet of cellulose acetate interposed therebetween and having bonded to each face thereof a coating of a stable cellulose nitrate having a nitrogen content of 10.8–12.5%, a viscosity of not more than 50 seconds, and an ash of not more than .4%, and a thin layer of triacetin between the contiguous surfaces of glass and cellulose nitrate.

4. Laminated glass comprising sheets of glass, a sheet of cellulose propionate interposed therebetween and having bonded to each face thereof a coating of a stable cellulose nitrate having a nitrogen content of 10.8–12.5%, a viscosity of not more than 50 seconds, and an ash of not more than .4%, and a thin layer of triacetin between the contiguous surfaces of glass and cellulose nitrate.

JAMES G. McNALLY.